United States Patent [19]

Corgan et al.

[11] 4,263,579
[45] Apr. 21, 1981

[54] TIRE PRESSURE ALARM

[75] Inventors: Donald M. Corgan, Long Beach; Raymond L. Grimes, Los Alamitos, both of Calif.

[73] Assignee: CGS Research and Development, Inc., Long Beach, Calif.

[21] Appl. No.: 94,713

[22] Filed: Nov. 15, 1979

[51] Int. Cl.³ .............................................. B60C 23/04
[52] U.S. Cl. .................. 340/58; 200/61.25; 73/146.5
[58] Field of Search ............ 340/58; 200/61.22, 61.25; 73/146.5, 146.4

[56] References Cited

U.S. PATENT DOCUMENTS

| | | | |
|---|---|---|---|
| 3,178,686 | 4/1965 | Mills | 340/58 |
| 3,215,978 | 11/1965 | Brown et al. | 340/58 |
| 3,296,590 | 1/1967 | Dalton | 340/58 |
| 3,588,815 | 6/1971 | Koonce | 340/58 |
| 4,075,603 | 2/1978 | Snyder et al. | 340/58 |
| 4,160,234 | 7/1979 | Karbo et al. | 73/146.5 X |

Primary Examiner—John W. Caldwell, Sr.
Assistant Examiner—Joseph E. Nowicki
Attorney, Agent, or Firm—Fulwider, Patton, Rieber, Lee & Utecht

[57] ABSTRACT

An electrical tire pressure alarm circuit includes an actuating connection to the vehicle storage battery which is keyed through a normally open disabling switch. The switch may be controlled by the vehicle ignition, by a trailer coupling, or it may be manually actuated. The transmitter is located on the vehicle wheel and responds to low tire pressure with a fixed frequency radio signal from a nominal input power less than 20 milliwatts. The transmitter oscillator is a tuned inductance/capacitance transistor oscillator circuit. An electromagnetic relay coil positioned on the vehicle frame closes an enabling switch to the transmitter only when the transmitter has been rotated by the wheel to a position proximate thereto, and only when the disabling switch has been closed. An alarm indicating system is located in the vehicle cab and is wired to the receiver and powered by the vehicle storage battery.

9 Claims, 5 Drawing Figures

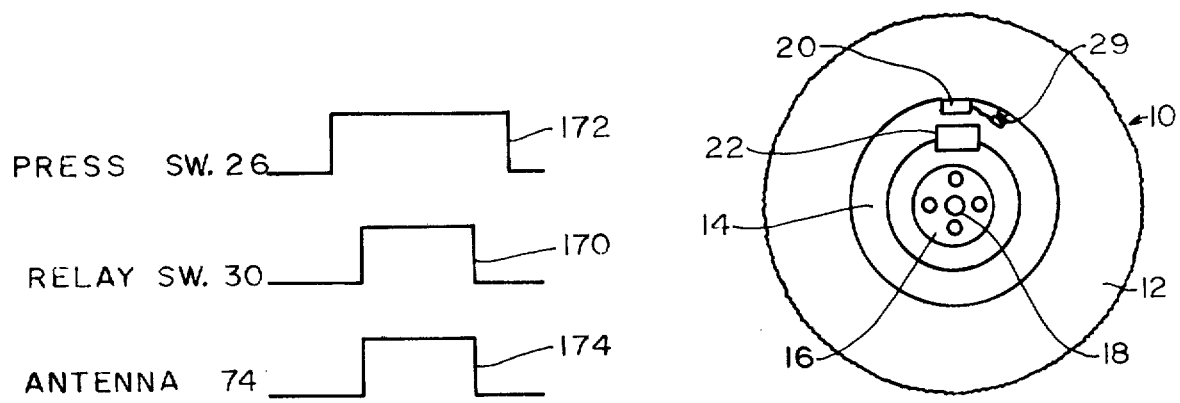
FIG 5
FIG 1
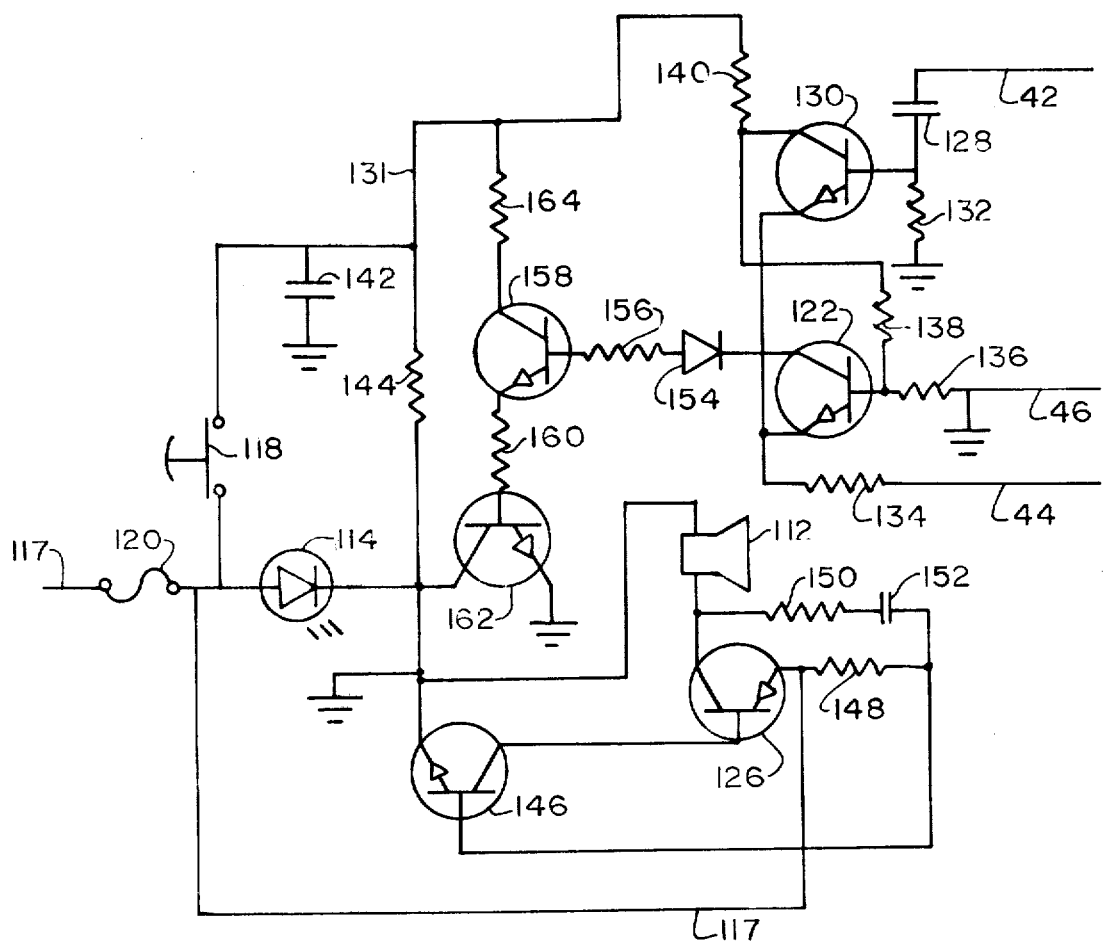
FIG 4

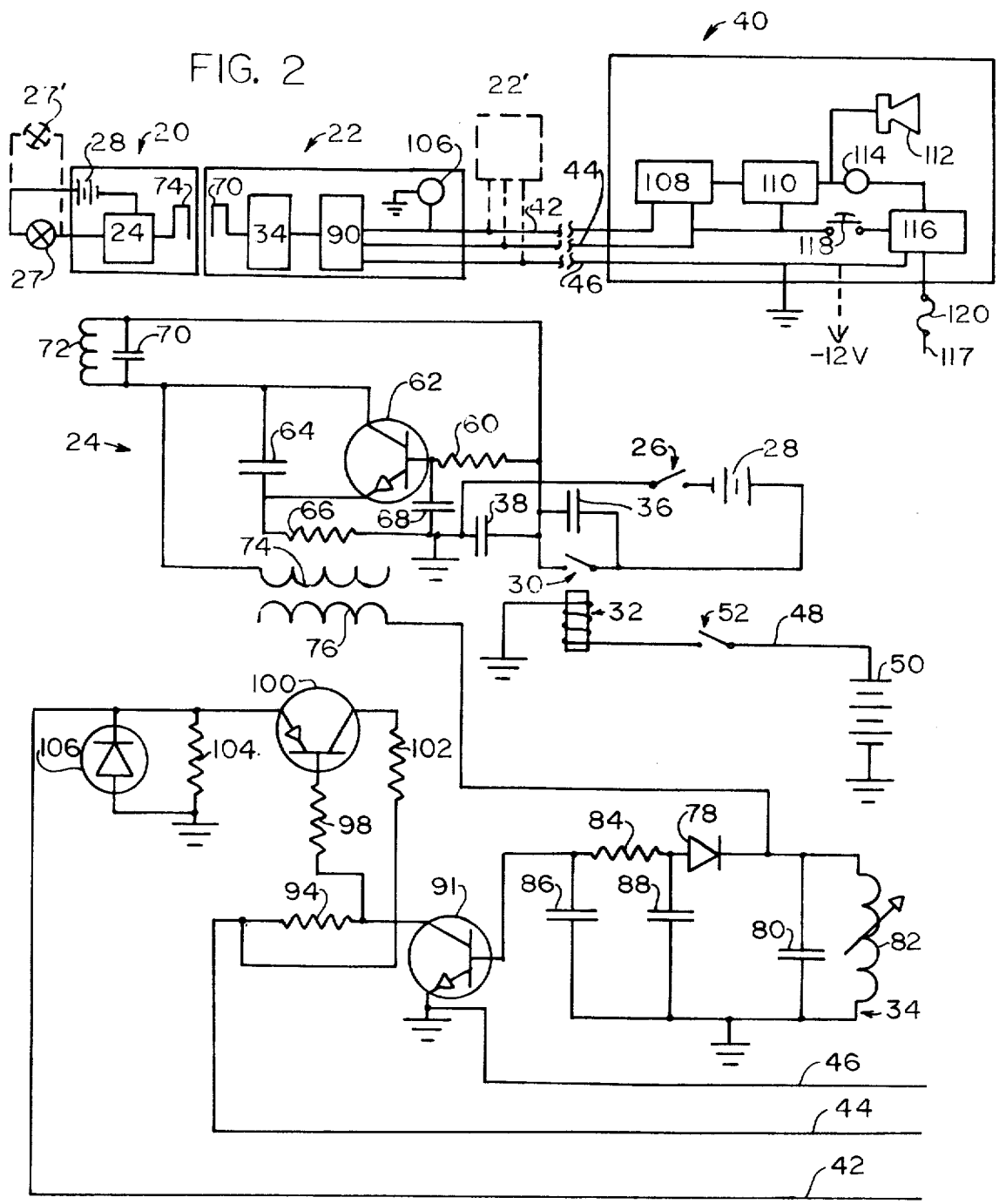

TIRE PRESSURE ALARM

BACKGROUND OF THE INVENTION

1. Field of the Invention

The present invention relates to tire pressure alarm systems for vehicles equipped with inflated tires.

2. Description of the Prior Art

Many tire pressure alarm systems have been devised which electronically signal a driver when tire pressure falls below a predetermined minimum level. Conventional systems involve small transmitters which respond to a low pressure condition within a vehicle tire by emitting a radio signal. The signal is transmitted to a receiver mounted on the vehicle frame. The receiver detects the existence of the radio signal, demodulates it, and generates an alarm signal which warns the vehicle operator that an inordinately low pressure exists in one or more of the tires of the vehicle. Such a condition is otherwise frequently undetectable by the operator of a heavy vehicle in which tires are mounted in tandem on an axle on each side of the vehicle. This is especially true when the inside tire is flat, since visual observation of such a condition is very difficult. Nevertheless when low pressure conditions such as this exist, the remaining vehicle tires and the vehicle suspension can be severely damaged by continued operation of the vehicle with a deflated tire.

While many different tire pressure alarm systems have been devised, all conventional systems have failed to solve certain perplexing problems, or to operate satisfactorily under certain conditions. In particular, conventional tire pressure alarm systems are typically powered by a direct lead from the vehicle battery. Accordingly, a vehicle in storage, or a vehicle which remains parked for a considerable period of time may experience a loss of pressure in one or more of the tires due to very slow leaks. Such slow leaks typically cause no problems since tires are checked and reinflated with normal vehicle maintenance in a vehicle that is used on a regular basis. However, when a low tire pressure condition exists in a vehicle parked without attention for lengthy periods, conventional tire pressure alarm systems operate just as if the vehicle were in use. Typically, under such conditions, the alarm is to no avail, since there is no driver, and frequently no other interested person in the immediate vicinity of the alarm. As a consequence, the alarm continues to operate and eventually runs down the vehicle battery or alarm transmitter power source.

Another problem with conventional vehicle tire pressure alarm systems is that any radio signals generated in response to a low pressure condition usually are inordinately powerful, and interfere with radio communications in the surrounding area. The Federal Communications Commission rules require all transmitters above 100 milliwatts in power input to be licensed for operation. As a consequence, tire pressure alarm systems requiring such licensing become commercially unattractive due to the governmental regulation and the attention and effort involved in compliance.

A further disadvantage of conventional tire pressure alarm systems is that the transmitters utilized employ crystal oscillators to generate radio frequency signals. While functionally quite satisfactory, such crystal oscillators are fragile, especially when subjected to the shocks and impacts that frequently occur in the operation of heavy trucks and semi-trailers. For this reason there is a high incidence of transmitter failure in conventional tire pressure alarm systems.

SUMMARY OF THE INVENTION

The present invention is a tire pressure alarm system for a vehicle with inflatable tires which includes a compact transmitter that operates on a nominal input power of less than 100 milliwatts. The transmitter is battery powered and includes a magnetically actuable enabling switch. The transmitter is fastened onto the vehicle wheel and a receiver is secured to the vehicle frame proximate to the wheel. The receiver includes an electromagnetic element and power connection leads from the vehicle electrical storage battery to the electromagnetic element, and includes a normally open disabling switch. The electromagnetic element closes the transmitter enabling switch only when the transmitter has been rotated into proximity with the receiver and only when the disabling switch has been closed. The receiver is comprised of a rugged, diode detector tuned to the radio frequency of the transmitter. An alarm is located in the cab of the vehicle, and wire connections extend between the receiver and the alarm. The switch may be closed by actuation of some mechanism associated with operation of the vehicle, such as by turning the vehicle ignition switch, by coupling a trailer to a truck tractor, or by manual operation. The tire pressure alarm system of the present invention has several unique and advantageous features as contrasted with prior art devices.

The tire pressure alarm system of the invention prevents the vehicle battery from being drained by the tire pressure alarm system when the vehicle is unattended. The battery connection to the tire pressure alarm is disabled by the vehicle ignition switch, by a switch associated with the coupling mechanism of a semitrailer to a truck tractor, or by a manual switch. Also, the electromagnetic element in the receiver will not close the magnetically activated enabling switch in the transmitter unless moved proximate thereto, so that the alarm system will not operate unless the vehicle wheels are rotating.

The transmitter and receiver of the present invention employ no fragile crystals which are subject to fracture from mechanical shock. Such shock is a frequent occurrence in the travel of semi-trailers and in the coupling operation by means of which such trailers are attached to truck tractors. The transmitter employs a tuned inductance-capacitance transistor oscillator circuit which operates at less than 20 milliwatts radio frequency power. Because of the low power requirement, the transmitter produces no significant interference to other radio systems in the area, and there is no licensing requirement for a transmitter of such a low power input. The receiver employs a tuned radio frequency diode detector.

The transmitter and receiver operate together only when both are in extremely close proximity to each other. At other times, the transmitter draws no power and the battery life therein is thereby preserved. Because of the necessary close proximity of operation, the transmitter and receiver are protected from external interference, since such interference must necessarily be from a relatively remote source.

A further feature of the invention is that the transmitter configuration is such that tire pressure may be checked, or the vehicle tires inflated without disturbing the alarm system. Unless the disabling switch is closed and the electromagnetic element actuated, the transmitter will not actuate the alarm. Accordingly, when the vehicle is at rest, the trailer decoupled, or the ignition is off, tire pressure can be manually checked and adjusted without activating the alarm.

Also, the system alarm of the invention is coupled to the receiver by means of several wires, and is not connected through the vehicle frame. The system can thereby be employed with negative ground, as well as positive ground automotive electrical systems. Furthermore, the electrical ground noise that typically occurs within vehicle frames does not affect the tire pressure alarm system of the invention.

A further feature of the invention is a simple RF adjustment which may be made on the receiver to more accurately tune the receiver to the transmitter. This adjustment may be performed with a small screwdriver. No other alignment is necessary. Also, the system is provided with a visual self-testing capability to confirm performance of both the transmitting unit and the receiving unit. This simplifies trouble shooting within the system and provides a convenient means for verifying system operation.

DESCRIPTION OF THE DRAWINGS

FIG. 1 is an elevational view of the positioning of the receiver and transmitter of the invention in association with a vehicle tire.

FIG. 2 is a general block diagram of the transmitter, receiver and alarm of the invention.

FIG. 3 is a detailed schematic diagram of the transmitter and receiver circuits.

FIG. 4 is a schematic diagram of the visual and audible alarm circuits.

FIG. 5 is a timing diagram useful in understanding the sequence of signals in the invention.

DESCRIPTION OF THE EMBODIMENT

FIG. 1 illustrates a vehicle wheel 10 which includes an inflatable tire 12 mounted upon a steel wheel rim 14 that is removably bolted to the brake drum 16. The brake drum 16 in turn is driven by a vehicle axle 18. A transmitter 20, according to the present invention, is mounted upon the wheel rim 14 and rotates therewith. A receiver 22 is located proximate to the transmitter 20 when the wheel 10 rotates to the position indicated in FIG. 1. However, the receiver 22 is not mounted upon the wheel 10, but instead is fixed relative to the vehicle frame. An alarm 40 in the vehicle cab is connected to the receiver 22 by means of wires 42, 44 and 46, as depicted in FIG. 2.

The transmitter 20 includes a fixed frequency radio signal generator circuit indicated at 24 in FIGS. 2 and 3. The signal generator circuit 24 includes a set of enabling electrical contacts 26 operated by pressure from the check valve 27 in the tire stem 29 of the tire 12, and which are open when pressure in the tire 12 is above a predetermined minimum level, as illustrated in FIG. 3. When pressure within the tire 12 falls below that level, the contacts 26 close. The transmitter 20 also includes a small, nine volt electrical battery 28 and a set of magnetically actuable switch closure contacts 30, illustrated in FIG. 3. The entire transmitter 20 is positioned on the vehicle wheel 10 and the switch contacts 26 are operably coupled to respond to air pressure from the tire stem 29 of the vehicle tire 12.

The receiver 22 includes an electromagnetic element in the form of a relay coil 32 illustrated in FIG. 3 for closing the magnetically operable switch closure contacts 30, which are formed from the relay armature. The receiver 22 includes a radio frequency diode detector 34 that is tuned to the frequency of radio frequency signal generator 24 of the transmitter 20. The alarm 40, depicted in FIG. 2, is located in the cab of the vehicle. A power connection 48 leads from the vehicle electrical storage battery through a normally open set of switch contacts 52 to the relay coil 32. Normally open disabling contacts 52 are coupled in circuit with some mechanism associated with vehicle operation. The mechanism may be the vehicle ignition, or the connecting elements used in the connection of a vehicle trailer to a truck tractor. Alternatively, a manually operated switch may be employed. Whatever the mechanism, closure of the contact points 52 occurs incident to operation of the vehicle.

The interactive circuitry of the transmitter 20 and receiver 22 are depicted in detail in FIG. 3. The transmitter is powered by the nine volt d.c. battery 28, which is coupled through the enabling contacts 26 associated with the check valve 27 in the valve stem 29 of the tire 12. The positive terminal of the battery 28 is connected to the magnetically actuated relay armature contacts 30 which are normally open but coupled together through a capacitor 36. The side of the contacts 30 remote from the positive terminal of the battery 28 is connected to a capacitor 38 which provides hysteresis to ensure that the transmitter has been activated sufficiently long enough per rotation to assure alarm reliability.

At the junction of the capacitors 36 and 38, a lead is connected to a resistor 60 that is coupled to the base of a transistor 62 in the radio signal generator 24, which is a tuned inductance-capacitance transistor oscillator circuit. The emitter of the transmitter 62 is connected to the junction between another capacitor 64 and a resistor 66, which is connected to ground. The base of the transistor 62 is also connected to ground through a capacitor 68. The collector of transistor 62 is coupled to the junction of the capacitor 64 with the tuning tank of the oscillator circuit, comprised of a capacitor 70 and inductor 72. The transmitter antenna 74 is also connected to the junction between the tuning tank and the capacitor 64.

As the transmitter 20 is cyclically rotated with the wheel 10 into proximity with the receiver 22, the magnetically actuated contacts 30 are closed by the relay coil 32 located in the receiver 22. The receiver antenna 76 detects the pulses of the tuned LC oscillator circuit of the transmitter 20 and directs these pulses to a radio frequency diode detector employing a detector diode 78, a tuning capacitor 80, and a variable tuning inductor 82. The inductor 82 is tuned to the radio frequency of the transmitter 22 by adjustment of a pot, which is manipulated by rotation with a screwdriver blade.

The capacitor 80 and inductor 82 are both connected to ground on the cathode side of the detector diode 78. A radio frequency bipass network is connected to the anode side of the detector diode 78 and includes a resistor 84 to either side of which a pair of capacitors 86 and 88 are coupled to ground. The bipass network is part of a d.c. amplifying network 90, which includes an amplifying transistor 91. The resistor 84 of the bipass network is connected to the base of the transistor 91, the emitter of which is connected to ground and to the negative feed line 46 which is connected to the alarm 40. The collector of the transistor 91 is coupled through a resistor 94 to the positive 12 volt d.c. supply line 44. The collector of the transistor 91 is also coupled through a resistor 98 to the base of a transistor 100 which serves a momentary d.c. switch. The collector of the transistor 100 is connected to the positive voltage supply line 44 through a resistor 102. The emitter of the transistor 100 is connected to ground through a limiting resistor 104, across which a LED 106 is connected in parallel. The cathode of the diode 106 and the emitter of the transistor 100 are connected to the wire 42, which is a signaling bus that leads to the alarm 40.

The alarm 40 is depicted generally in FIG. 2 and includes a bistable switch 108, a d.c. driver amplifier 110, an audible alert indicator 112 a visual alert indicator 114, a d.c. filter 116 and a reset button 118. The circuit of the alarm 40 is illustrated in detail in FIG. 5.

A 12 volt d.c. supply line 117 is connected through a ⅛ amp fuse 120 to the visual alert indicator 114, which is a light emitting diode. The cathode of the diode 114 is connected to the emitter of a transistor 162 and also to the emitter of another transistor 146 in an audio signal amplifying stage. The positive 12 volt d.c. supply line 117 is also connected to the emitter of another transistor 126 in the audio amplifying stage.

The signal lead 42 from the receiver 22 is coupled through a capacitor 128 to the base of a transistor 130, which is connected to ground through a resistor 132. Transistors 122 and 130 together form the bistable switch 108, depicted in FIG. 2. The collector of the transistor 122 is coupled through a diode 154 and resistor 156 to the base of an amplifying transistor 158. The emitter of transistor 158 is connected through a resistor 160 to the base of another amplifying transistor 162, the emitter of which is coupled to ground. The emitter of the resistor 130 and the emitter of the resistor 122 are coupled in parallel to the positive 12 volt d.c. supply line 117 through a dropping resistor 134. The base of the transistor 122 is coupled to the negative d.c. supply, or negative feed, which may be grounded, through a resistor 136. The base of the transistor 122 is also connected through a resistor 138 to the collector of the transistor 130.

The collector of transistor 130 and the base of transistor 140 are connected in a path through line 131 to the normally closed momentary reset switch 118. A capacitor 142 is coupled to ground from line 131. The collector of transistor 158 is connected to the line 131 through a resistor 164. Line 131 is also connected through a resistor 144 to the emitter junction of amplifying transistors 162 and 146. The collector of transistor 146 is coupled to the base of another amplifying transistor 126. The emitter of transistor 126 is connected in a loop to the base of transistor 146 through a resistor 148. The collector of the transistor 126 is connected to the audible alarm 112, which may be an earphone and also to a resistor 150 and a capacitor 152 in a feedback loop to the base of the transistor 146.

In the operation of the invention the vehicle ignition must first be turned on, the trailer must be in position connected to the truck tractor, or a manually operable switch must be thrown in order to effectuate closure of the normally open disabling switch contacts 52. With the switch contacts 52 closed, the electromagnetic relay coil 32 is energized. However, relay 32 closes the relay armature contacts 30 only when the wheel 10 rotates the relay contacts 30 close to the relay coil 32. This occurs when the transmitter 20 rotates with the tire 12 close to the receiver 22, to the positions indicated in FIG. 1.

As desired, the switch contacts 52 may be connected in series with the vehicle ignition a trailer/truck coupling, or a manual switch. Once the switch contacts 52 are closed, rotation of the wheel 10 causes the relay coil 32 to close the switch contacts 30 as the transistor 20 rotates proximate to the position of the receiver 22. This energization pulse is indicated at 170 in FIG. 5. Concurrently, the transmitter 20 will only function to transmit radio signals to the receiver 22 if the switch contacts 26 associated with the check valve 27 in the vehicle valve stem 29 are likewise closed. This switch closure is indicated at 172 in FIG. 4. With both of these conditions present, the transistor 62, together with the capacitor 80 and tuned inductance 82 generate a radio signal output at the transmitter antenna 74.

This signal occurs during the coincidence of pulses 170 and 172, and is indicated at 174 in FIG. 5. The receiver antenna 76, is located proximate to the transmitting antenna 74 when the wheel is in the position of FIG. 1. The receiver antenna 76 passes the radio frequency pulsed signal to the tuned tank circuit 34. If a radio signal of the appropriate frequency is detected, a very low impedance through the tuned tank circuit 34 is established to ground, thereby allowing the detector diode 78 to conduct current. This lowers the voltage level at the base of transistor 91, thereby reducing a reverse bias to the d.c. amplifying transistor 91. The transistor 91 provides a cyclic signal to transistor 100, which shapes the signal to d.c. pulses which are carried to the signaling bus line 42. As pulses appear on the emitter of transistor 100, the light emitting diode 106 will be illuminated, thereby verifying the operation of both the transmitter 20 and the receiver 22.

Once the intermittent d.c. signal is transmitted from the receiver 22 on line 42, it appears at the base of transistor 130 of the bistable switch 108 in the alarm 40, illustrated in FIG. 4. The collector of the transistor 130 is coupled to the base of transistor 122 to thereby latch transistor 122 on. The collector signal from transistor 122 drives the amplifying transistors 158 and 162 to turn on the LED indicator 114. Concurrently, transistors 158 and 162 also power an earphone, or other audible speaker which provides an audible alarm indication. The bistable switch 108 (FIG. 2) formed by the transistors 122 and 130 can be reset by momentary depression of the reset switch 118, which provides a resetting signal to the base of transistor 122. The amplifying transistors 158 and 162 drive the visual alarm indicator 114 and also the audible earphone 112 when the bistable switch 108 is latched to forward bias the transistors 158 and 162. The LED 114 and the earphone 112 are slient whenever the reset switch 118 has been actuated.

As previously noted, the d.c. voltage on the signal bus line 42 is only present when the wheel alarm transmitter 20 is rotated adjacent to the receiver module 22 and when the transmitter has been activated both by closure of the switch contacts 26, in response to an under pressure condition at the check valve 27, and by closure of the switch contacts 30 which occurs only when the transmitter 20 and receiver 22 are rotated adjacent to each as depicted in FIG. 1. Moreover, closure of the switch 52 is also required to enable the relay solenoid 32 to close the relay contacts 30. Switch 52 is a disabling switch and is closed to provide power under any one of several actuating conditions associated with vehicle operation. Where the vehicle includes a tractor and trailer separable therefrom, the condition necessary to closure of the switch 52 may be coupling of the trailer to the tractor. Alternatively, or in addition, the switch 52 may require the closure of the ignition switch for the vehicle. In yet another circuit arrangement, the switch 52 may require manual actuation. In any event, closure of relay contacts 30 is necessary to provide a pulse 170, and closure of the pressure sensitive switch 26 is required to provide the pulse 172. During the interval that both pulses 170 and 172 are concurrently present, the radio signal generator 24 provides an RF output through its antenna 74 to the receiver 22.

It is possible to utilize a single alarm 40 with a plurality of receivers, such as the receiver 22 and the additional receiver indicated at 22'. It is to be understood that the receiver 22' is of like construction to that depicted at 22. Each receiver 22 and 22' is associated with a separate transmitter on a separate vehicle wheel, and all are coupled to the common alarm 40.

With the modular receiver arrangement depicted in FIG. 2, from one to twenty receivers may be connected to the same alarm 40. The alarm 40 may provide for a parallel input in which there is one alarm indication only. Alternatively, individual inputs to provide one audible alarm and up to 20 LED indicators can be provided as individual outputs from the several receivers 22 and 22'. Likewise, dual wheels on an axle may be wired so that the pressure switch 26 may respond to pressure at both check valves 27 and 27'. These check valves are associated, respectively, with each of the wheels, and may operate a single transmitter 22.

It should be noted that the negative supply wire 46 connects the receivers 22 and 22' to the alarm 40. In addition, the positive 12 volt d.c. supply line 44 also is connected between the receivers and the alarm 40. By providing wire conductors for the ground circuit, as well as the active power line, the device of the present invention avoids the vehicle frame noise which frequently is induced in the frame of an automotive vehicle. Such a noise distorts signals transmitted from a receiver in conventional tire pressure monitoring devices.

The alarm 20 converts the pulsating d.c. signal on line 42 to a d.c. alarm status voltage by means of the bistable latch 108. The illumination of the visual display 114, or other output of the alarm 40, is thereby continuous until reset by the reset button 118. The alarm 40 operates on a nominal 12 volt d.c. power supply, but may be operated from between 11.5 and 16 volts. The earphone 112 provides an audible alert of approximately 1,000 hertz so that it may be clearly heard by the vehicle driver.

The batteries 28 which are used in the transmitter 20 may be operated continuously for two hours, although as previously explain operation is only intermittent to produce the alarm pulses 174, as depicted and explained in connection with FIG. 5.

By providing for the simple adjustment of the RF tank circuit 34 in the receiver 24, minimal operating adjustments are required. The LED 106 will light when the receiver 22 is tuned to the appropriate, matching frequency of the transmitter 20, and when the transmitter 20 is operating, thereby providing a self-testing capability that confirms the performance of both the transmitter 20 and the receiver 22.

The preferred electronic components of the embodiment illustrated are as set forth below in Table I.

TABLE I

| Transistors | | |
|---|---|---|
| 62 | - | 2N3567 |
| 91,122,126,130,146,158,162 | - | 2N2102 |
| 100 | - | 2N3638 |

| Capacitors | |
|---|---|
| 64 | 5 pf |
| 70 | 22 pf |
| 68 | 470 pf |
| 86,88 | .001 mf |
| 152 | .022 mf |
| 128 | .047 mf |
| 80 | 20 mf |
| 142 | 25 mf |
| 38 | 500 mf |
| 36 | .01 mf |

| Resistors | |
|---|---|
| 66 | 470 ohms |
| 84,98 | 56 K ohms |
| 102 | 30 K ohms |
| 104,164 | 10 K ohms |
| 94 | 22 K ohms |
| 144 | 270 ohms |
| 160 | 1 K ohms |
| 156 | 47 K ohms |
| 140 | 1800 ohms |
| 132,136 | 20 K ohms |
| 138 | 15 K ohms |
| 134 | 1200 ohms |
| 150 | 390 ohms |
| 60,148 | 100 K ohms |

Undoubtedly variations and modifications of the various elements of the invention will occur to those familiar with tire pressure warning systems. Accordingly, the scope of the invention should not be considered as restricted to the specific embodiment depicted, but rather is defined in the claims appended hereto.

We claim:

1. A tire pressure alarm system for a vehicle having a frame with an operator compartment and mounted on wheels with inflatable tires and having an electrical storage battery comprising:

a compact transmitter including a low pressure responsive, fixed frequency radio signal generator with a nominal input power less than 100 milliwatts, an electrical battery for said transmitter and magnetically actuable switch closure contacts located between said signal generator and said transmitter battery, all positioned on a vehicle wheel and having enabling electrical contacts in circuit and operable by an air pressure check valve of a vehicle tire mounted on said wheel, and rotatable with said wheel relative to the frame of said vehicle, a receiver secured to said vehicle frame proximate to said wheel and including:

an electromagnetic element for closing said magnetically actuable switch closure contacts only when said transmitter is rotated with said wheel into proximity therewith, and a radio frequency diode detector tuned to said radio frequency signal generator, an alarm located in the cab of said vehicle with a wired connection to said receiver, and a power connection leading from said vehicle electrical storage battery to said electromagnetic element and including a normally open disabling switch therein which is closed by a mechanism associated with vehicle operation.

2. A tire pressure alarm system according to claim 1 further characterized in that said disabling switch is closed to provide power to said electromagnetic element through the ignition switch of said vehicle.

3. A tire pressure alarm system according to claim 1 further characterized in that said vehicle includes a tractor and a trailer separable therefrom, and said disabling switch is closed to provide power to said electromagnetic element by coupling said trailer to said tractor.

4. A tire pressure alarm system according to claim 1 further comprising a plurality of receivers, each associated with a transmitter on separate vehicle wheels, and all of said receivers are coupled to said alarm.

5. A tire pressure alarm system according to claim 1 wherein said receiver further comprises a visual indicator electrically connected to respond to an output of said radio frequency diode detector.

6. A tire pressure alarm system according to claim 1 wherein said alarm further comprises a bistable switch wired to said receiver, an audible alarm indicator coupled to said bistable switch, and manually operable means for resetting said bistable switch.

7. A tire pressure alarm system according to claim 6 further comprising a visual alarm indicator coupled in parallel with said audible alarm indicator.

8. A tire pressure alarm system according to claim 1 further characterized in that said radio signal generator is comprised of a tuned inductance capacitance transistor oscillator circuit.

9. A tire pressure alarm system according to claim 1 further characterized in that said mechanism associated with vehicle operation is a manually operable switch.

* * * * *